(12) United States Patent
Morgan et al.

(10) Patent No.: US 7,721,205 B2
(45) Date of Patent: May 18, 2010

(54) INTEGRATION OF COMPOSITE OBJECTS IN HOST APPLICATIONS

(75) Inventors: Ashley L. Morgan, Santa Clara, CA (US); Barn-Wan Li, San Jose, CA (US); Ke-Cheng Huang, Cupertino, CA (US); Michael Kim, Sunnyvale, CA (US); Sissie Ling-le, Santa Clara, CA (US); Robert L. C. Parker, Burlingame, CA (US); Amit Kumar, East Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 1027 days.

(21) Appl. No.: 11/228,867

(22) Filed: Sep. 15, 2005

(65) Prior Publication Data

US 2007/0094607 A1 Apr. 26, 2007

(51) Int. Cl.
*G06F 17/21* (2006.01)
(52) U.S. Cl. .................................... 715/273; 715/200
(58) Field of Classification Search ................. 715/762, 715/273
See application file for complete search history.

(56) References Cited

U.S. PATENT DOCUMENTS

| | | | |
|---|---|---|---|
| 4,498,145 A | 2/1985 | Baker et al. ................. 707/202 |
| 5,682,468 A * | 10/1997 | Fortenbery et al. .......... 345/419 |
| 5,850,507 A | 12/1998 | Ngai et al. .................... 714/16 |
| 6,282,547 B1 | 8/2001 | Hirsch ........................ 707/102 |
| 6,374,251 B1 | 4/2002 | Fayyad et al. ............... 707/101 |
| 6,380,954 B1 * | 4/2002 | Gunther ....................... 715/764 |
| 6,493,826 B1 | 12/2002 | Schofield et al. .............. 726/22 |
| 6,539,396 B1 | 3/2003 | Bowman-Amuah ..... 707/103 R |
| 6,618,851 B1 | 9/2003 | Zundel et al. ............... 713/103 |
| 6,654,757 B1 | 11/2003 | Stern .......................... 707/101 |
| 6,711,577 B1 | 3/2004 | Wong et al. ................. 707/101 |
| 6,725,421 B1 * | 4/2004 | Boucher et al. ............. 715/205 |
| 6,732,090 B2 | 5/2004 | Shanahan et al. ............... 707/3 |
| 6,772,170 B2 | 8/2004 | Pennock et al. ............. 707/102 |
| 6,778,979 B2 | 8/2004 | Grefenstette et al. ........... 707/3 |
| 6,820,075 B2 | 11/2004 | Shanahan et al. ............... 707/3 |
| 7,499,955 B2 | 3/2009 | Kao et al. .................... 707/202 |
| 2003/0078913 A1 | 4/2003 | McGreevy ..................... 707/3 |
| 2003/0078935 A1 | 4/2003 | Zibin et al. ................. 707/101 |
| 2004/0220954 A1 | 11/2004 | Zhou et al. .................. 707/101 |
| 2004/0230888 A1 | 11/2004 | Kramer et al. ........... 715/501.1 |
| 2005/0015729 A1 | 1/2005 | Fernandez et al. .......... 715/765 |
| 2005/0171967 A1 | 8/2005 | Yuknewicz et al. ......... 707/101 |
| 2005/0278625 A1 | 12/2005 | Wessling et al. .............. 715/62 |
| 2006/0230311 A1 | 10/2006 | Kao et al. .................... 707/202 |
| 2006/0242591 A1 | 10/2006 | Van Dok et al. ............ 715/762 |
| 2007/0061343 A1 | 3/2007 | Morgan ...................... 707/100 |

(Continued)

*Primary Examiner*—Doug Hutton
*Assistant Examiner*—Tionna Smith
(74) *Attorney, Agent, or Firm*—Merchant & Gould; Ryan T. Grace

(57) ABSTRACT

A graphical object is generated according to a first application in a document of a second application. The graphical object is constructed as a composite, data-driven object. The graphical object's data is organized so that the semantic data (e.g., relationship among individuals on an organizational chart) is persisted separately from presentation data (e.g., the layout and style of shapes and connectors for visualizing the organizational chart). The semantic data and presentation data are combined to provide the rendered view of the graphical object within the document. The graphical object displays and functions equivalently to when the graphical object is rendered by the first application.

19 Claims, 7 Drawing Sheets

U.S. PATENT DOCUMENTS

| | | |
|---|---|---|
| 2007/0061351 A1 | 3/2007 | Villaron et al. .............. 707/101 |
| 2007/0094607 A1 | 4/2007 | Morgan et al. .............. 715/762 |
| 2007/0106952 A1 | 5/2007 | Matas et al. ................. 715/764 |
| 2007/0174307 A1 | 7/2007 | Villaron et al. .............. 707/100 |

* cited by examiner

INTEGRATION OF COMPOSITE OBJECTS IN HOST APPLICATIONS

BACKGROUND

As the number of applications available for performing tasks on a computing device increases, the need for integration among these applications also increases. For a number of applications, such as word processor applications, spreadsheet applications, graphical applications, and presentation applications, some integration is already available. For example, certain applications allow objects from one or more of the other applications to be embedded within the documents that the application creates. For example, a table generated by a spreadsheet application may be embedded directly amongst text in a word processor document created by a word processor application. The variety of embedding solutions available result in a variety of advantages and disadvantages associated with each solution.

SUMMARY

Aspects of the system and methods described herein are generally related to providing integration of a graphical object in a host application where the graphical object is a composite, data-driven object that distinguishes the semantic data related to the object from the presentation data. These composite objects have distinct advantage over other embedded objects in that the composite objects interact as expected with the host application's functionality. Other embedded objects are often translated to an image that is embedded as the object in the host application document. Embedding an object as an image prevents the object from being editable inside the host application document. Formatted as an image, the embedded object does not allow access to the full range of features provided by the original application in which the object was created. Embedded images are also associated with large file sizes, generating large documents that are cumbersome to use.

In contrast, a composite object as described herein may be stored according to its semantic data and then rendered according to its presentation properties at runtime. For example, an organizational chart is composed of relationships between positions in an organization. The organizational chart is typically shown in a series of shapes with connectors that illustrate the hierarchy of the organization. These organizational charts are often embedded into presentations written in another application for presentation to groups in the organization. The shapes used in the organizational chart are typically the same (e.g., boxes with text). Instead of storing the data for the organizational chart as a picture of the chart, composite objects store the chart data separated into semantic data and presentation data. The relationship of nodes or hierarchy of the organizational chart is stored as the semantic data. The shape properties for generating the boxes and connectors are stored as the presentation data. At runtime, the semantic data and presentation data are combined to display the content of the composite object. The composite object's separation of semantic data and presentation data provides an opportunity to reduce and/or eliminate the storage of repeated presentation data. Also the organizational chart's native functionality of the application in which it was created is available while embedded in the presentation application document. A copied organizational chart into the host application displays and functions equivalently to the chart as it appears in its native application. Furthermore, by separating out the semantic data, the composite object framework ensures that the data is not hidden amongst opaque properties associated with one or more shapes of a composite object.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of the present invention are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments of the present invention may be practiced as methods, systems or devices. Accordingly, embodiments of the present invention may take the form of an entirely hardware implementation, an entirely software implementation or an implementation combining software and hardware aspects. The following detailed description is, therefore, not to be taken in a limiting sense.

The logical operations of the various embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Illustrative Operating Environment

Figure 1:
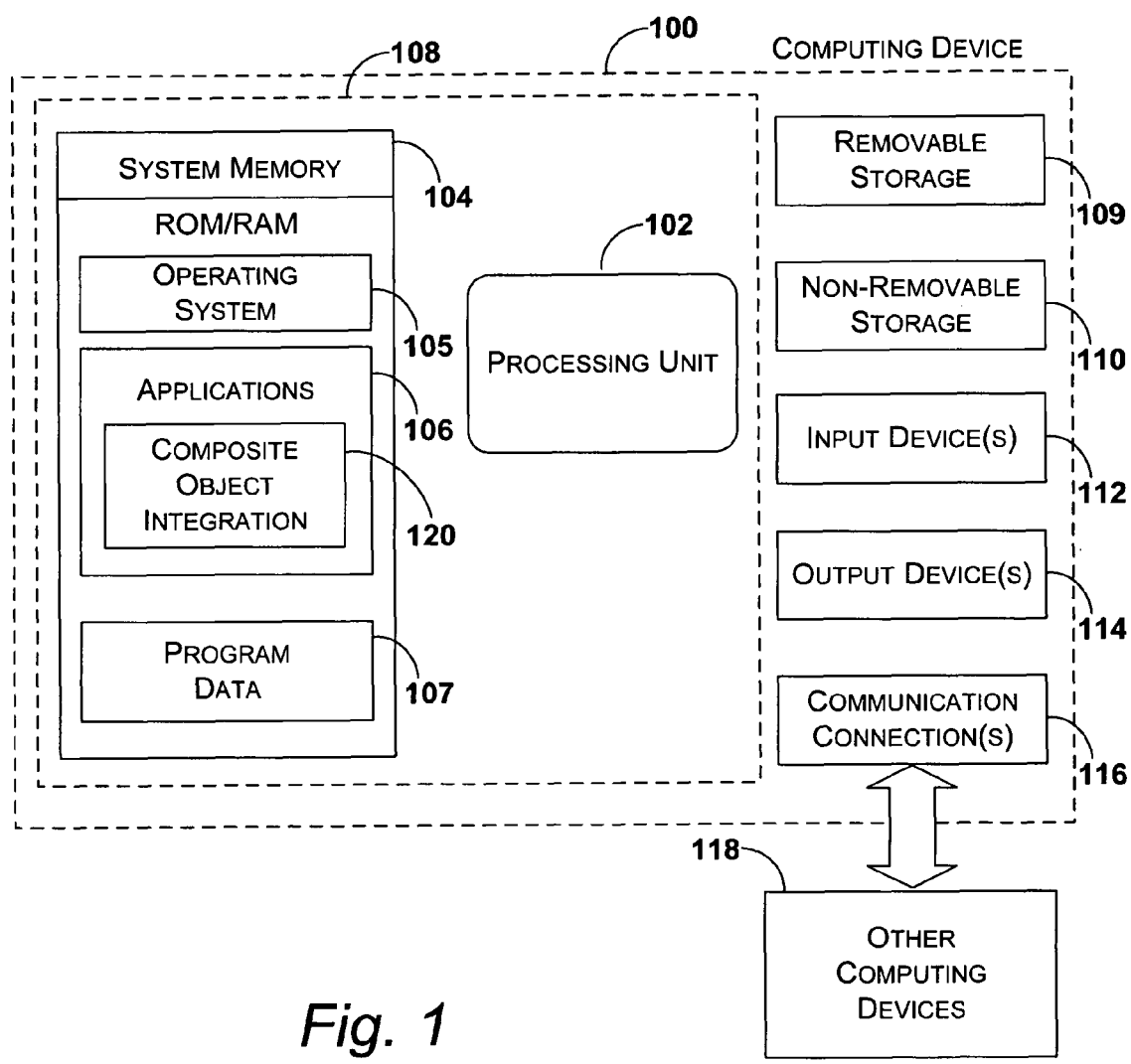
FIG. 1 illustrates an exemplary computing device that may be used in one exemplary embodiment.

With reference to FIG. 1, one exemplary system for implementing the invention includes a computing device, such as computing device 100. Computing device 100 may be configured as a client, a server, mobile device, or any other computing device. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a composite object integration application 120 for implementing the system of the present invention. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Embodiments for Integrating Composite Objects in Host Applications

Embodiments of the present invention relate to integrating composite objects into a host application, wherein the composite objects differentiate between semantic data and presentation data associated with the object. One standard for embedding an object in document of another application is referred to as the Object Linking and Embedding (OLE) standard. OLE is a compound document standard developed by the Microsoft® Corporation of Redmond, Wash. OLE enables a developer to create objects with one application and then link or embed them in a second application. Embedded objects retain their original format and links to the application that created them. Accordingly, when the document linked to the object is edited and updated, the object itself is also updated. However, OLE has distinct disadvantages since it often stores the embedded object as an image, creating large files and objects that can't be edited inline. Instead, embodiments of the present invention take advantage of composite, data-driven objects that separate the types of data associated with the object to provide a framework for embedding editable objects in a host application document. The present invention provides a logical description of shapes that may be used to provide a sequence/set of effects for rendering. In one embodiment, the set of effects is associated with a rendering abstraction layer that sits on top of a graphical application program interface (API) that is used to ultimately render the image. Generally, the use of the composite objects produce these abstraction layer effects not by directly creating and arranging the effects themselves, but rather by creating a hierarchy of 'shapes', 'group shapes', and 'text boxes'. The shapes and group shapes are described by a set of properties (e.g., shape properties that apply to a particular shape or group shape properties that apply to a group of shapes). The shape properties are a more logical, high-level way of describing shapes or groups of shapes than provided according to the lower-level abstraction layer effects. These shape properties and group shape properties are then 'translated' into the actual effects that are rendered to the screen. In an alternative embodiment, some composite objects do create these effects directly, when the visual/presentation data required is not easily expressible as a hierarchy of 'shapes' and 'group shapes'.

Figure 2:
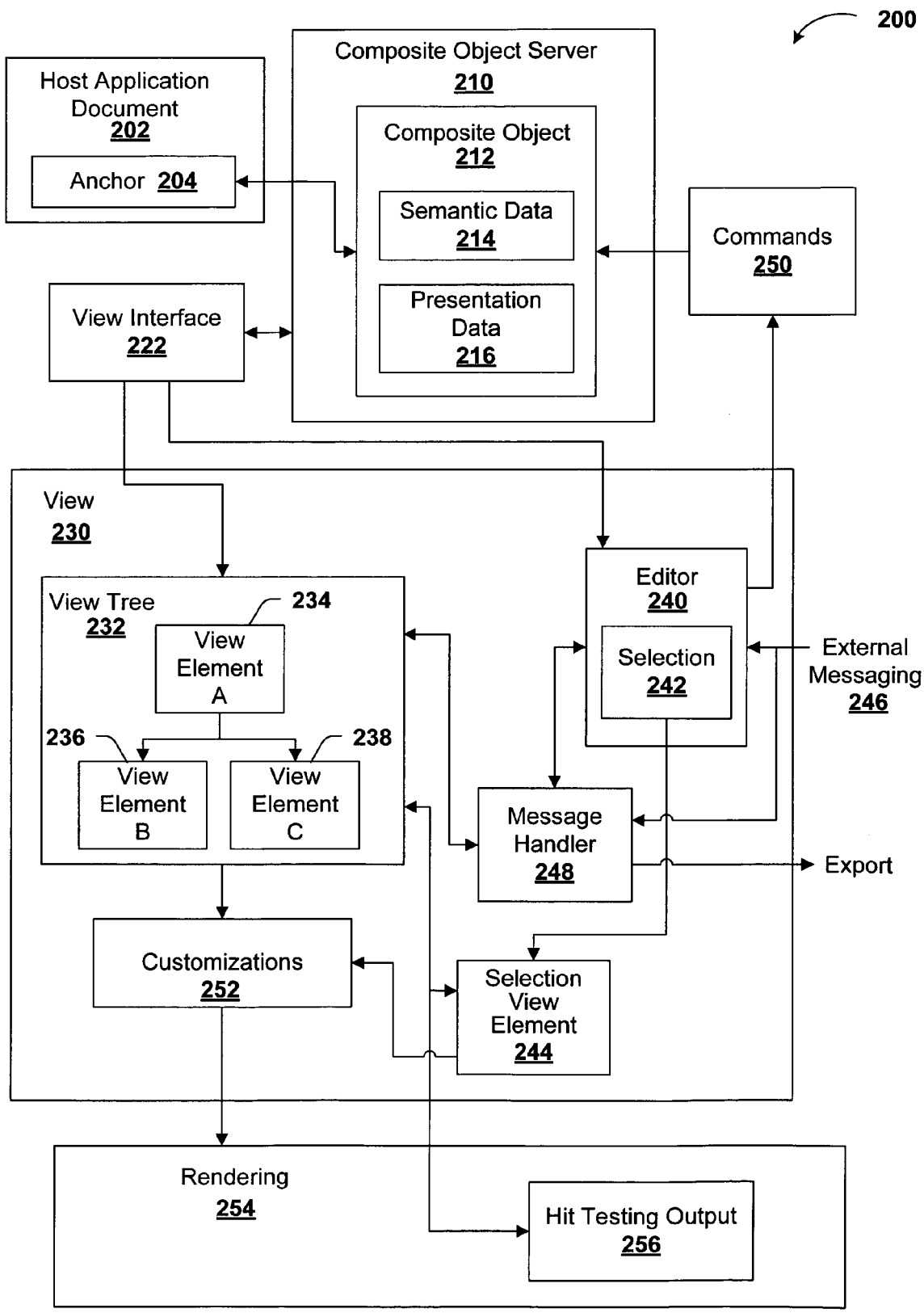
FIG. 2 shows a block diagram of an exemplary system for integrating a composite object in a host application.

FIG. 2 shows a block diagram of an exemplary system for integrating a composite object in a host application in accordance with one embodiment of the present invention. System 200 includes host application document 202, composite object server 210, view interface 222, view 230, commands module 250, rendering layer 254, and external messaging input 246.

Host application document 202 includes anchor 204. Anchor 204 is a placeholder that designates the presence of a composite object (e.g., 212). In one embodiment, the application document is written in an extensible markup language (XML) and the anchor is a tag in the XML that references the composite object. Anchor 204 is defined in a format of the host application and is owned by host application document 202. Anchor 204 designates the placement and positioning of the composite object in host application document 204 when the host application document is rendered. Additional embodiments include additional anchors referenced in host application document 204, where additional composite object servers and additional composite objects may be associated with these anchors. Rendering of the composite objects included in a particular host application is discussed further below with reference to FIG. 5.

Composite object server 210 is a server that is called for loading a composite object shown as composite object 212. Composite object 212 further comprises semantic data 214 and presentation data 216. In one embodiment, semantic data 214 corresponds to the underlying data that provides the relationship between the shapes of composite object 212. For example, for a composite object that corresponds to an organizational chart, semantic data 214 corresponds to the hierarchy of positions within the organization. Generally, semantic data 214 includes the information that distinguishes one instance of a composite object from another instance of that same composite object. In contrast, presentation data 216 may be the same for different instances of the same composite object. Some examples of semantic includes a data series (i.e. rows and columns of data) for a chart composite object, a sequence or hierarchy of text (i.e. a multi-level outline) for a diagram composite object, a set of rows, columns, and text for a table composite object, and the like. Depending on the particular composite object, the logic that creates the hierarchy of shapes/group shapes from semantic data 214 may be wholly contained in the runtime code or it may read some parameters from the persisted data. System 200 therefore allows the composite objects to store data other than just that hierarchy of shapes or group shapes. In contrast to semantic data 214, presentation data 216 correspond to the layout data of the composite object. In the organizational chart example, presentation data 216 corresponds to the layout and style of the shapes. A more detailed description of a composite object is discussed further below with regard to FIG. 4.

Composite object server 210 implements view interface 222 in response to a query from view 230 when anchor 204 is discovered while creating view 230 for host application document 202. Once view interface 222 is created, it is then owned by view 230. View interface 222 creates the view elements (e.g., 234) and the editors (e.g., 240) associated with view 230 so that the view may be rendered and edited. In one embodiment, the view elements and editors are generated on an "on demand" basis. Generating the view elements and editors "on demand" refers to creating them when needed, and generally not significantly before they are needed.

View 230, as shown, includes view tree 232, editor 240, selection view element 244, message handler 248, and customizations module 252. View tree 232 may include one or more view elements (e.g., 234, 236, 238) that are aggregated to form a renderable view of host application document 202. In one embodiment, each view element (e.g., 234, 236, 238) may include one or more shape property bags (SPBs) that describes the hierarchy of visual shapes included in view 230. Each view element includes information about that element, including the content, bounds, and positioning of the element. Customizations module 252 may be used to add visual customizations to the view elements (e.g., a customization that presents the view elements in black-and-white).

Editor 240 owns one or more selections (e.g., 242). A selection corresponds to the range of text, objects, or other elements of the rendered document which the user desires to edit. In one embodiment, the selection of or within the composite object corresponds to the semantic data of the composite object (e.g., bars in a bar chart, row of cells in a table, etc.) Selection 242 is created in response to external messages provided by external messaging 246 that correspond to mouse events, keyboard entries, and other external events corresponding to user inputs that edit composite object 212. Editor 240 decides whether or not to consume events, and if so, passes them to message handler 248 for this purpose. Message handler 248 decides which portion of view 230, if any, is responsible for handling the event from external messaging 246. The decision is based on hit testing data received from hit testing output 256 (described below). When editor 240 is responsible for consuming the event, editor 240 generates selection 242.

Each selection (e.g., 242) corresponds to the change to semantic data 214 or possibly presentation data 216 of composite object 212. In response to implementing selection 242, editor 240 provides an output corresponding to selection information to commands module 250. Commands module 250 interprets the editor output and performs an operation back onto composite object 212 that implements any changes to the content of composite object 212.

Editor 240 also generates selection view element 244. Selection view element 244 corresponds to the rendered representation of selection 242. Selection view element 244 may correspond to the highlighting of the text, the dots surrounding a shape, or other indicia that an element has been selected for editing. Similar to the view elements (e.g., 234, 236, 238), customizations (e.g., 252) may be applied to selection view element 244 prior to the rendering of view 230.

View 230 may be used to pass instructions to rendering layer 254 to render the view elements (e.g., 234, 236, 238) and any selection view elements (e.g., 244). Rendering layer 254 also includes hit testing output 256. Hit testing output 256 is queried by the view elements and selection view elements to determine whether the element was hit in response to an event from external messaging 246. From the hit testing data, an editor of view 230 is selected for handling the event. The chosen editor is then able to use the hit testing data corresponding to the elements to determine how to render view 230 with the changed made. In the case where no editor consumes the event, message handler 248 may export the event to other processes external to view 230 for handling.

Despite that system 200 is illustrated with functional blocks where only one functional block is shown (e.g., one anchor, 204), it is appreciated that multiples of the functional blocks may be included without departing from the spirit or scope of the invention. For example, multiple anchors may be included within a host application document that references multiple composite objects. Each of these composite objects may correspond to one or more composite object servers. Additionally, multiple editors and view elements may correspond to the composite objects when generating a view of the composite object in the host application document. These additional embodiments are similarly configured to provide integration of composite, data-driven objects within host applications.

Figure 3:
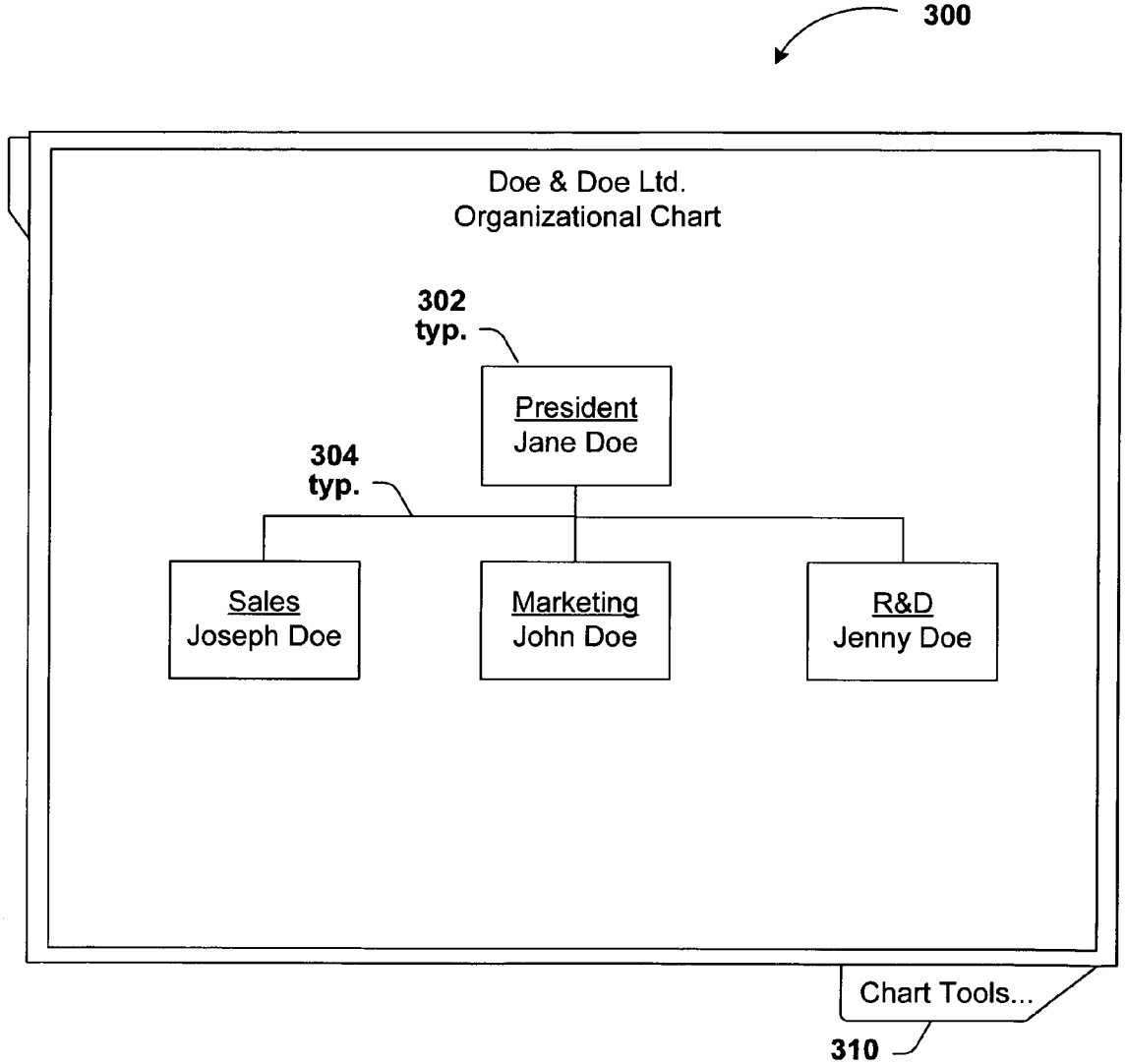
FIG. 3 illustrates a screenshot of an exemplary embedded composite object that corresponds to an organizational chart.

FIG. 3 illustrates a screenshot of an exemplary embedded composite object that corresponds to an organizational chart in accordance with one embodiment of the present invention. Chart 300 is a type of graphical object that may be integrated in a host application as a composite object. The organizational chart example is a simple example that illustrates that difference between the semantic data of the object and the presentation data. The presentation data corresponds to the layout of the node elements (e.g., 302), or blocks, and the connectors (e.g., 304). The semantic data is the data included in the node elements and the relationship of the data. For example, the semantic data includes that the root node corresponds to the President, Jane Doe, while the other nodes correspond to other individuals that are child elements of the root node. The root/child relationship of the nodes is indicative of the hierarchical relationship of the individuals listed. Accordingly, the semantic data is data-driven, providing the relationship between individuals in the organization, while the presentation data concentrates on the layout and style used to display the relationship. With repeated shapes in the chart, much of the presentation data may be consolidated, with each node of chart 300 being linked to a single description of a shape that corresponds to all nodes and a description of single connector type. Previously, for some embedded object designs, an embedded object would simply be stored as an image. If a similar organizational chart included fifty nodes, then an image that corresponds to the data of all 50 nodes and 50 connectors would be stored. The file size of the embedded object could increase such that it is no longer usable depending on the amount of information included in the embedded object. By allowing composite objects to separate their persisted semantic data from the presentation data, the present invention allows the storage requirements for some particular composite objects to be significantly reduced when the composite objects have repeated shapes. There is also some possible size reduction with regard to style and richer graphic elements. For example, creating gradients, drop shadows, glow effects may have much smaller associated file sizes. Storage of the data corresponding to a composite object is described in greater detail below with relation to FIG. 4.

Chart 300 provides a simple example of one type of graphical object that lends itself to storage a composite object. Other object that take advantage of the composite object structure are bar charts, diagrams, tables, and other objects that may be described by a combination of shapes and text.

Chart 300 also shows tab selector 310 that directs a user viewing the chart to a set of chart tools that are available for editing the chart. In one embodiment, tab selector 310 appears when a user has selected chart 300 in the host application document for editing or other manipulation. The chart tools option provides the user with the functionality of the application that the chart was originally created in while in the host application. Accordingly, despite being located in another application document, a full range of composition options may be presented to the user for editing chart 300 directly in the host application.

Figure 4:
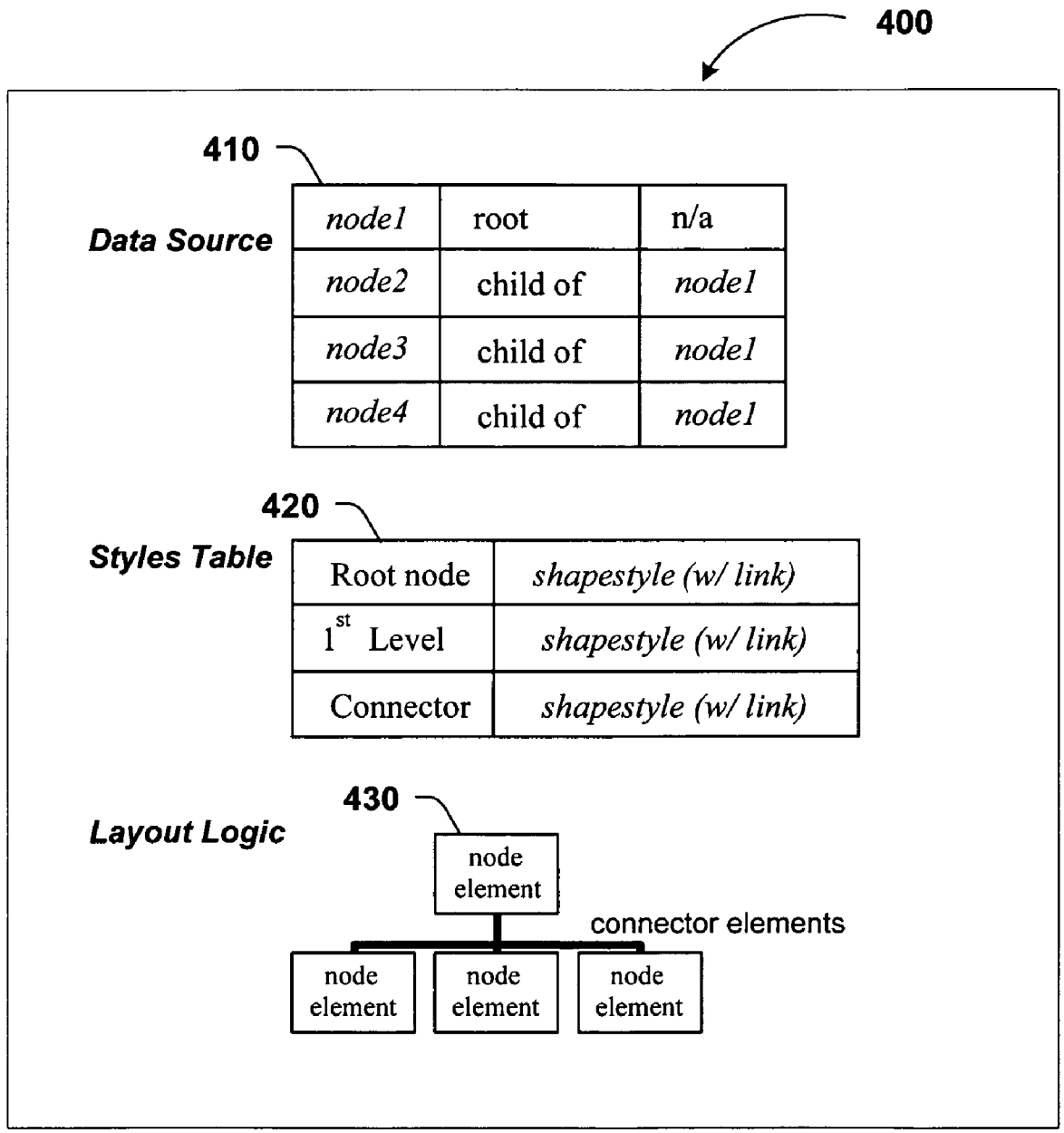
FIG. 4 shows a functional block diagram for an exemplary composite object storage structure that corresponds to an organizational chart.

FIG. 4 shows a functional block diagram for an exemplary composite object storage structure that corresponds to an organizational chart in accordance with one embodiment of the present invention. Storage structure 400 includes both the stored semantic data and the stored presentation data. Storage structure 400 includes data source 410, styles table 420, and layout logic 430.

Data source 410 includes a listing of the nodes of an organizational chart (e.g., chart 300 of FIG. 3) and describes the parent/child relationship between the nodes. Data source 410 corresponds to the persisted, semantic data of the composite object. The structure of data source 410 is provided by way of example only, and the semantic data of the composite object may be stored in alternative formats such as multi-dimensional data structures, structured lists, or the like.

Styles table 420 and layout logic 430 provide presentation for the composite object. Styles table 420 illustrates that the style of the nodes and connectors is defined according to a shapestyle definition that is pointed to by styles table 420. In one embodiment, depending on the type of object, a user may be limited in the changes that can be performed to a style. Layout logic 430 provides a description of the layout of the nodes in the organizational chart. The structures of styles table 420 and layout logic 430 are provided by way of example only, and the presentation data of the composite object may be stored in alternative formats such as multi-dimensional data structures, structured lists, or the like.

In an additional embodiment, the composite object additionally includes a header that includes general information about the composite object. In accordance with one aspect of the present invention, the header includes a uniform resource identifier (URI) for the composite object that describes the type of composite object and may therefore be used as a key to determine which composite object server should be invoked to load and handle the object data.

In still a further embodiment, the composite object includes a GVML or shapes XML description of the shapes of the composite object that provides a minimum visual tree of the composite object's shapes in case decomposing the data of the composite object fails.

Figure 5:
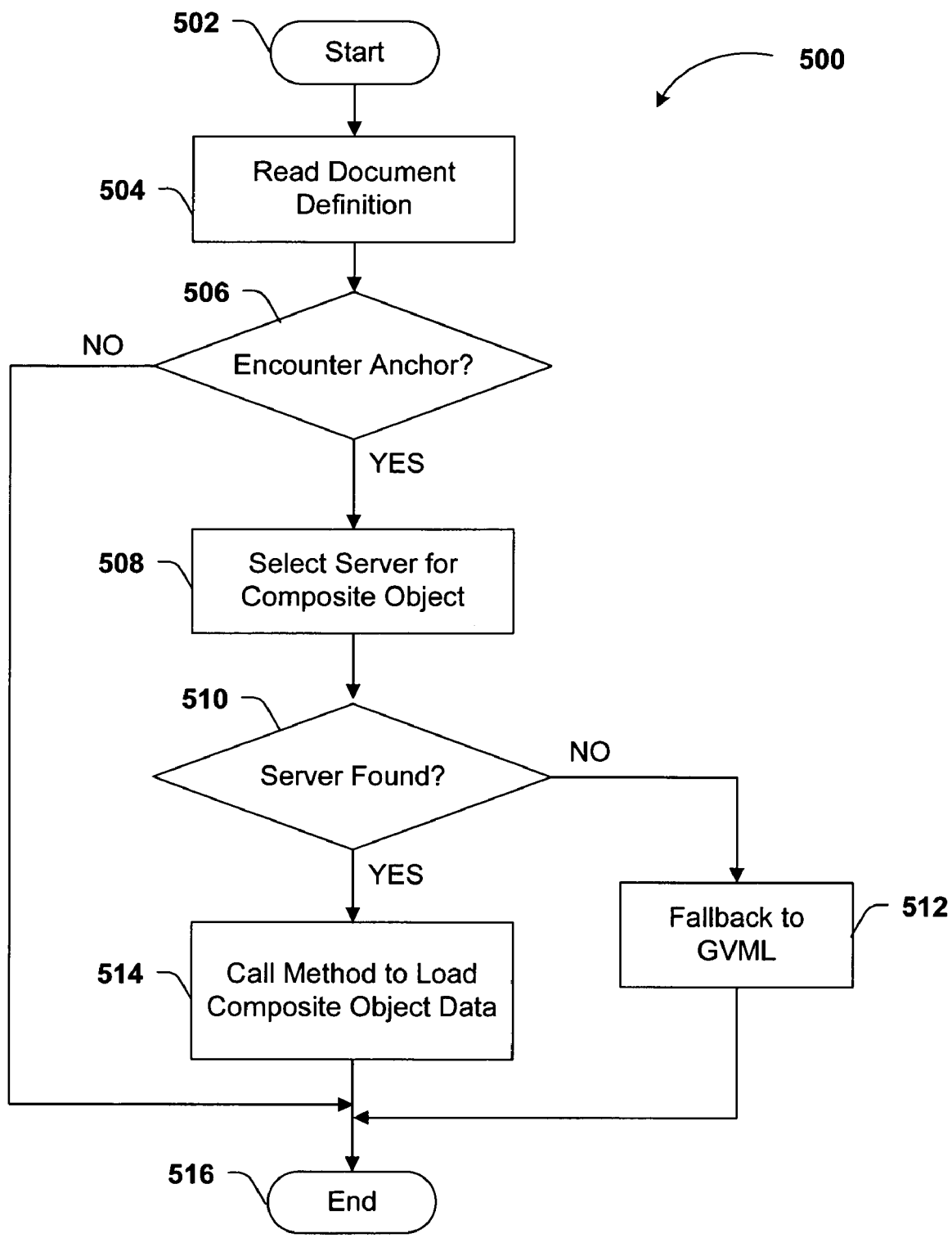
FIG. 5 illustrates a logical flow diagram of an exemplary process for loading a composite object in a host application document.

FIG. 5 illustrates a logical flow diagram of an exemplary process for loading a composite object in a host application document in accordance with one embodiment of the present invention. Process 500 starts at block 502 where one or more anchors that reference composite objects are included in the definition of a document in a host application. Process continues at block 504.

At block 504, the document definition is read. The document definition may be written in XML or another language that may be used to describe a document. The document may be read to load the document into memory or output/render the document to an output device such as a monitor or printer. As the document definition is read, processing continues to decision block 506.

At decision block 506, a determination is made whether an anchor that represents a composite object is encountered in the document definition. The anchor acts as a placeholder, defining the position of the composite object in the document. If no anchor is encountered, processing continues to block 516 where process 500 ends and the document may be loaded without any composite objects and/or processing may move on to other tasks. However, if an anchor is encountered, processing continues at block 508.

At block 508, a server is selected that provides support for generating and storing the composite objects. The server refers to any computing device that is capable of processing the composite object, including the computing device storing the host application and document. In one embodiment, the server is identified according to a uniform resource identifier (URI) included in a header portion of the composite object. In an additional embodiment, the schema representing the composite object is also examined to determine an appropriate server. Processing continues at decision block 510.

At decision block 510, a determination is made whether the selected server is found or located for processing the composite object. If the server for the composite object is not located, processing moves to block 512 where the loading of the composite object falls back to a GVML description, or basic tree description, of the shapes so at least a basic version of the object is loaded. In an alternative embodiment, the GVML is not provided as a fallback, but is instead included for composite objects that decide for themselves whether to leverage alternate content block features for providing GVML along with the full composite object structure. Stated differently, maintaining a GVML representation is not a requirement of a composite object, but an option left up to the composite object to select. Also, instead of designating a specific place to store GVML as part of the schema describing the composite object, a file format feature is provided to supply multiple representations of the object. If the composite object server is located, processing continues to block 514.

At block 514, a load method is called on the composite object that passes to the composite object server the data corresponding to a definition of the composite object (e.g., an XML definition of the composite object). The passed data is parsed into to the semantic data and the presentation data for those composite objects that may separate their data accordingly. Once the data is parsed, processing continues to block 516, where process 500 ends and processing may move on to rendering a view of the composite object in the host application document or other tasks.

Figure 6:
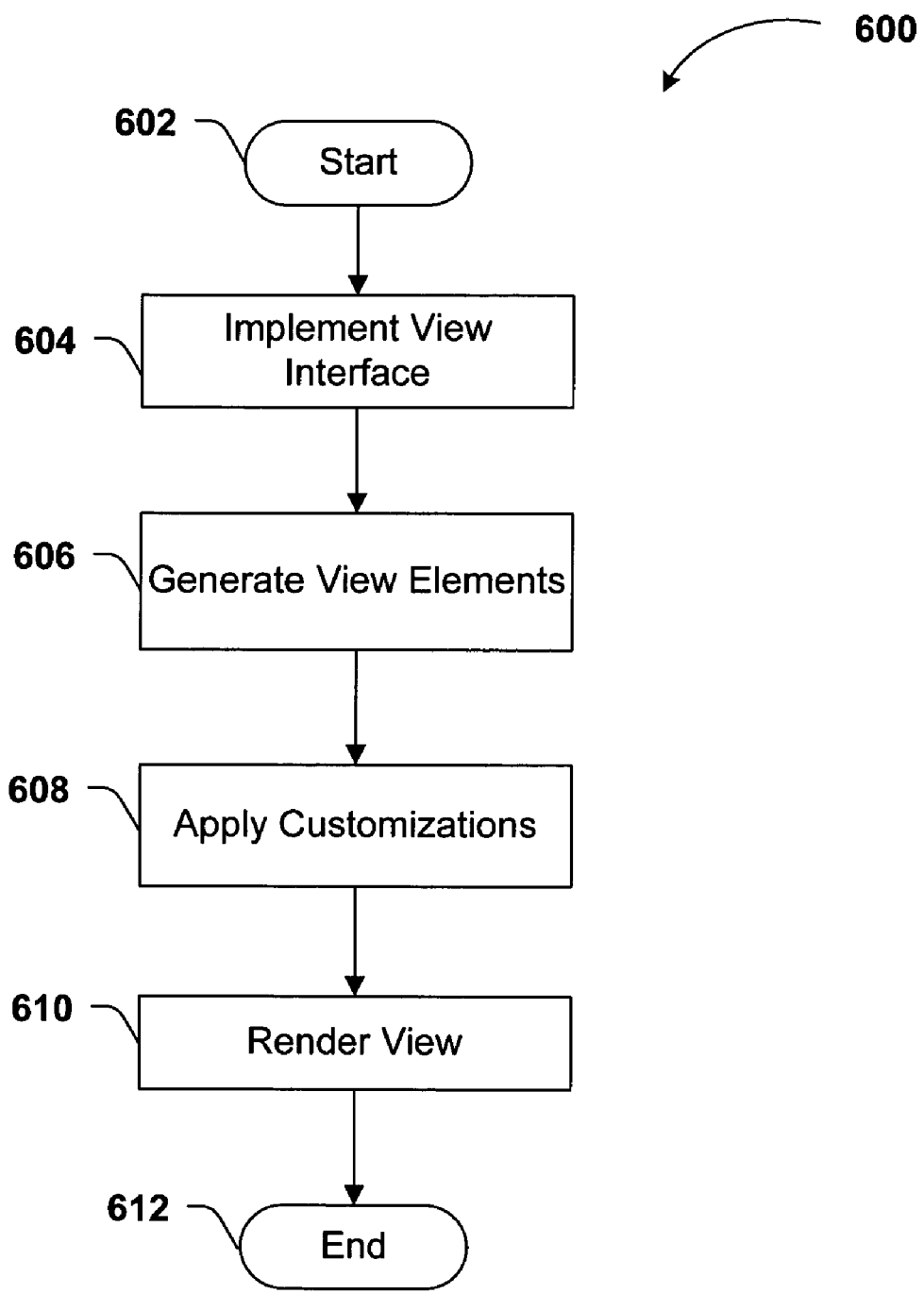
FIG. 6 shows a logical flow diagram of an exemplary process for rendering a composite object in a view of a host application document.

FIG. 6 shows a logical flow diagram of an exemplary process for rendering a composite object in a view of a host application document in accordance with one embodiment of the present invention. Process 600 starts at block 602 where a composite object is loaded and a view is in the process of being generated for rendering the host application document as an output to a display, printer, or other output device. Processing continues at block 604.

At block 604, a view interface (e.g., view interface 222 in FIG. 2) is implemented by the composite object server (e.g., composite object server 210. Once implemented, the view interface is then owned by the view and may be used by the view for generation of view elements and editors corresponding to the composite object. Once the view interface is generated, processing continues at block 606.

At block 606, the view elements corresponding to the host application and the composite objects within the host application are generated for rendering the view. In accordance with one embodiment, the view elements include one or more view elements related to composite objects included in the host application document. The view elements are organized in a hierarchical tree structure that corresponds to the structure of the host application document. In an additional embodiment, the view elements are generated by the view interface by combining the presentation and semantic data of the composite object into the view element. Once the view elements are generated, including any view elements corresponding to composite objects, processing continues at block 608.

At block 608, any target-specific parameters, or other customizations associated with that particular view, are applied to the view. For example, the view rendering may be dependent on the output device or other view data (e.g., currently zoomed, etc.). Other customizations may include rendering one or more of the view elements in black-and-white, or a variety of other selections corresponding to the view. Once the customizations are applied, processing continues to block 610.

At block 610, the view is rendered. In one embodiment, the shape properties of the view are translated into lower level graphics primitives. In a further embodiment, the lower level graphic primitives correspond to GEL (Graphics Effects Layer) paths generated from the translation. A GEL factory then creates a meta-object that corresponds to the composite object embedded in the rendered view. In one embodiment, for rendering, the translated data is output to a target device (e.g., display screen, printer) using graphic services provided in accordance with the operating system (e.g. GDI+). Once the view is rendered, processing continues to block 612 where process 600 ends and processing can move to editing a composite object or other tasks.

Figure 7:
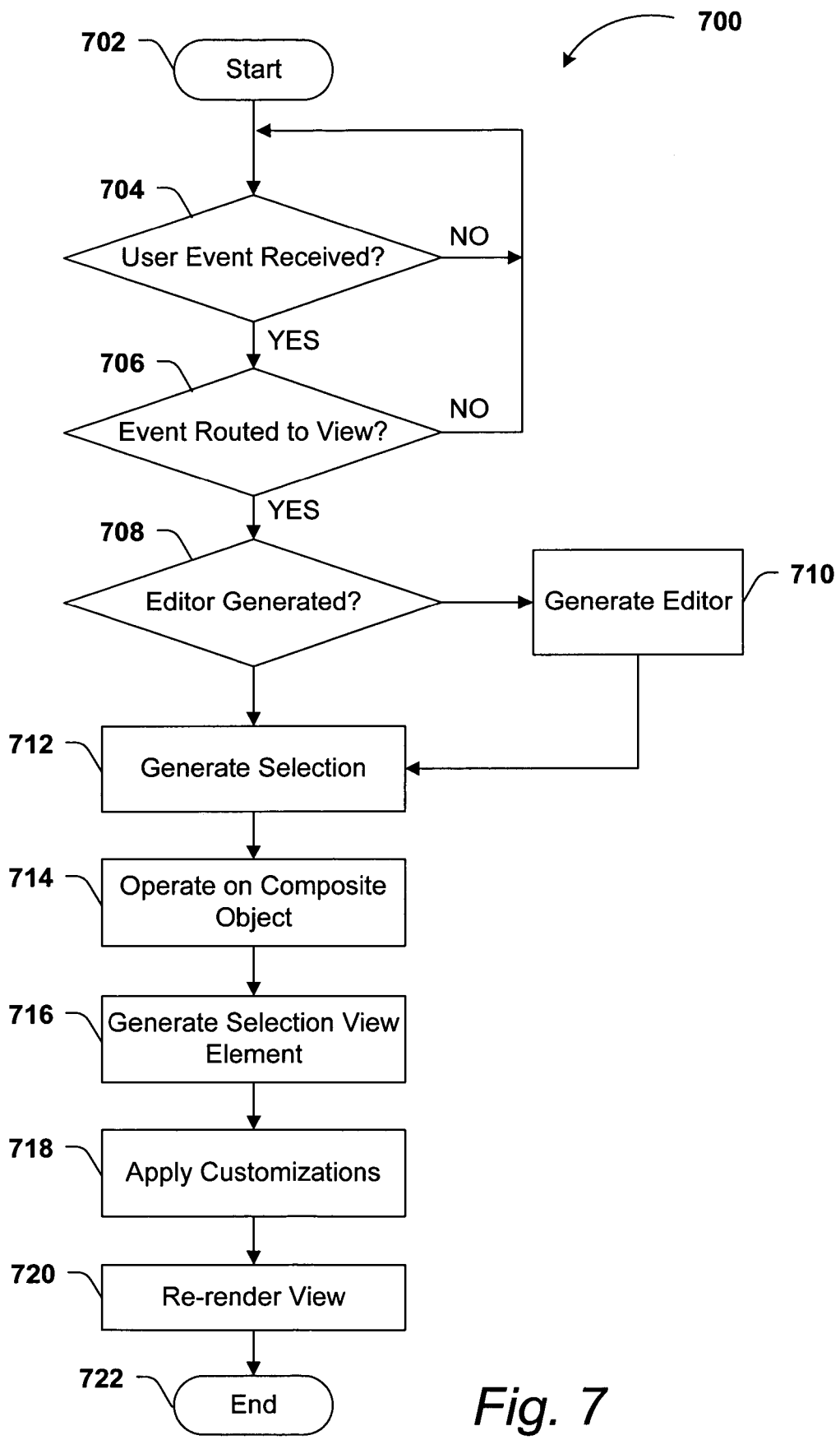
FIG. 7 illustrates a logical flow diagram of an exemplary process for editing a composite object in a view of a host application document, in accordance with one embodiment of the present invention.

FIG. 7 illustrates a logical flow diagram of an exemplary process for editing a composite object in a view of a host application document in accordance with one embodiment of the present invention. Process 700 starts at block 702 where a view of the host application document has been rendered and has been presented to the user on a screen or using another output. Processing continues at decision block 704.

At decision block 704, a determination is made whether a user event has been received that may cause a selection, change, or other edit to occur to one of the view elements of the view. The user event may correspond to keystrokes, mouse clicks, or other user inputs related to the host application document. If such a user event is not received, processing returns to decision block 704 to await the receipts of a user event. In contrast, if a user event is received, processing continues at decision block 706.

At decision block 706, a determination is made whether the event that is received is intended to be routed to the view for handling. In certain cases, the user event may be unrelated to the host application document or any of the composite objects. If the user event is not intended for handling by the view, then processing returns to decision block 704 to await the receipt of another user event. However, if the user event is meant to be handled by the view, processing continues at decision block 708.

At decision block 708, a determination is made whether an editor has been generated to handle the edit when the edit corresponds to one of the composite objects in the host application document. In one embodiment, the view interface generates the editors for the composite objects on an "on demand" basis where the editor is not generated until needed. If the editor has not already been generated for the composite object being edited, processing moves to block 710.

At block 710, the editor is generated by the view interface for editing the composite object. With the editor generated, or if the editor was previously generated, processing continues at block 712.

At block 712, a selection is generated that corresponds to the editor created. The selection corresponds to aggregation of editor information with user event information. In an additional embodiment, the editor also aggregates hit testing data with the other information to provide a more accurate determination of the objects in the rendered view being edited. Once the information is aggregated and the selection is generated, processing continues at block 714.

At block 714, commands or provided to the composite object server for editing the composite object. The aggregated information corresponding to the selection is communicated to a command module that generates a set of commands for editing the composite object in response to the user event. These commands are then forward for operation on the composite object. With the composite object updated, processing continues to block 716.

At block 716, a selection view element is generated that corresponds to the selection that was generated by the editor. The selection view element corresponds to any visualizations that correspond to the selection by the user within the composite object. For example, the user may have highlighted a string of text for editing. Selection view element is generated to provide the information for rendering the highlight of the text. Selection view element is complimentary to the other view elements of the view, but may not be necessary depending on the type of editing performed by the user. Once the selection view element is generated, processing continues at block 718.

At block 718, any target-specific parameters, or other customizations associated with that particular view, are applied to the view. For example, the view rendering may be dependent on the output device or other view data (e.g., currently zoomed, etc.). Other customizations may include rendering one or more of the view elements in black-and-white, or a variety of other selections corresponding to the view. In one embodiment, the customizations are applied to both the view elements and any selection view elements generated. Once the customizations are applied, processing continues to block 720.

At block 720, the view is re-rendered to include the editing to the composite object. The rendering is similar to the rendering described with relation to block 610 of FIG. 6 above. In one embodiment, the re-rending of the view is similar to the original rendering of the view with the addition that the view now corresponds to the aggregate of any view elements, any changes to content of the composite object, and any selection view elements created. Once the view is rendered, processing continues to block 722 where process 700 ends and processing can move to editing a composite object or other tasks.

The processes described in FIGS. 5-7 may be repeated as necessary, and may have their process steps rearranged, certain process steps deleted, or additional process steps added without departing from the spirit or scope of the invention.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-readable storage medium having computer executable instructions executing on a processor for embedding a graphical object generated according to functionality of a first application in a document of a second application, the computer executable instructions comprising:

storing the graphic object generated according to the functionality of the first application, wherein semantic data of the graphic object is stored separately from presentation data of the graphic object in a composite object server, wherein the semantic data identifies a hierarchical relationship of shapes in the graphic object, wherein the presentation data indicates a layout and style of the shapes of the graphic object;

embedding the graphic object, via an anchor, in the document of the second application, wherein the embedded graphic object is rendered in the document of the second application by:

identifying the anchor within the document of the second application, accessing the composite object server according to the anchor within the second application to obtain the stored presentation data and the stored semantic data of the graphic object, and combining the presentation data and the semantic data to generate a rendered view of the graphic object within the document of the second application, wherein the rendered view is editable according to the functionality of the first application without an executing instance of the first application.

2. The computer readable storage medium of claim 1, wherein the composite object server parses the graphic object to identify the semantic data and the presentation data when the graphic object is stored in the composite object server.

3. The computer readable storage medium of claim 1, wherein the embedded graphic object is rendered in the document of the second application by generating a view interface, wherein the view interface combines the semantic data and the presentation data.

4. The computer readable storage medium of claim 3, wherein the view interface includes a shape property bag that indicates properties of shapes within the graphic object.

5. The computer readable storage medium of claim 3, wherein an edit function is received related to an editor generated by the view interface in response to a user event.

6. The computer readable storage medium of claim 5, wherein the generated editor causes the edit function to execute on the graphic object stored in the composite object server.

7. The computer readable storage medium of claim 1, wherein the semantic data and the presentation data are stored as a table within the composite object server.

8. A system for embedding a graphical object generated according to functionality of a first application in a document of a second application, the system comprising:

a processor; and a memory having computer executable instructions stored thereon, wherein the computer executable instructions are configured for:

storing the graphic object generated according to the functionality of the first application, wherein semantic data of the graphic object is stored separately from presentation data of the graphic object in a composite object server, wherein the semantic data identifies a hierarchical relationship of shapes in the graphic object wherein the presentation data indicates a layout and style of the shapes of the graphic object;

embedding the graphic object, via an anchor, in the document of the second application, wherein the embedded graphic object is rendered in the document of the second application by:

identifying the anchor within the document of the second application, accessing the composite object server according to the anchor within the second application to obtain the stored presentation data and the stored semantic data of the graphic object, and combining the presentation data and the semantic data to generate a rendered view of the graphic object within the document of the second application, wherein the rendered view is editable according to the functionality of the first application without an executing instance of the first application.

9. The system of claim 8, wherein the composite object server parses the graphic object to identify the semantic data and the presentation data when the graphic object is stored in the composite object server.

10. The system of claim 8, wherein the embedded graphic object is rendered in the document of the second application by generating a view interface, wherein the view interface combines the semantic data and the presentation data.

11. The system of claim 10, wherein the view interface includes a shape property bag that indicates properties of shapes within the graphic object.

12. The system of claim 10, wherein an edit function is received related to an editor generated by the view interface in response to a user event.

13. The system of claim 12, wherein the generated editor causes the edit function to execute on the graphic object stored in the composite object server.

14. A computer-implemented method for embedding a graphical object generated according to functionality of a first application in a document of a second application, the computer-implemented method comprising:

generating a graphic object on a first application according to the functionality of the first application;

storing the graphic object, wherein semantic data of the graphic object is stored separately from presentation data of the graphic object in a composite object server, wherein the semantic data identifies a hierarchical relationship of shapes in the graphic object, wherein the presentation data indicates a layout and style of the shapes of the graphic object;

embedding the graphic object, via an anchor, in the document of the second application, wherein the embedded graphic object is rendered in the document of the second application by:

identifying the anchor within the document of the second application, accessing the composite object server according to the anchor within the second application to obtain the stored presentation data and the stored semantic data of the graphic object, and combining the presentation data and the semantic data to generate a rendered view of the graphic object within the document of the second application;

receiving an edit function within the second application for the rendered view of the graphic object within the document of the second application according to functionality of the first application;

causing execution of the edit function on the rendered view of the graphic object within the document of the second application according to the functionality of the first application by:

sending a call from an editor component associated with the second application to cause the edit function to execute on the graphic object stored in the composite object server, and after execution of the edit function, recombining the presentation data and the semantic data to generate a rendered view of the graphic object having an edit related to the edit function within the document of the second application.

15. The computer-implemented method of claim 14, wherein the composite object server parses the graphic object to identify the semantic data and the presentation data when the graphic object is stored in the composite object server.

16. The computer-implemented method of claim 14, wherein the embedded graphic object is rendered in the document of the second application by generating a view interface, wherein the view interface combines the semantic data and the presentation data.

17. The computer-implemented method of claim 16, wherein the view interface includes a shape property bag that indicates properties of shapes within the graphic object.

18. The computer-implemented method of claim 16, wherein receiving an edit function includes receiving an edit function by the editor component.

19. The computer-implemented method of claim 14, wherein the semantic data and the presentation data are stored as a table within the composite object server.

* * * * *